United States Patent [19]

Foster et al.

[11] Patent Number: 5,693,171
[45] Date of Patent: Dec. 2, 1997

[54] METHOD AND APPARATUS FOR SEAMING CARPETS

[75] Inventors: Scott L. Foster, Fremont; Robert N. King, Sunnyvale, both of Calif.; George Fred Acton, Birmingham, Ala.

[73] Assignee: Orcon Corporation, Alameda, Calif.

[21] Appl. No.: 339,061

[22] Filed: Nov. 14, 1994

Related U.S. Application Data

[63] Continuation-in-part of Ser. No. 206,030, Mar. 3, 1994, Pat. No. 5,376,419, which is a continuation of Ser. No. 867,126, Apr. 10, 1992, abandoned, which is a continuation of Ser. No. 522,263, May 11, 1990, Pat. No. 5,104,475.

[51] Int. Cl.$^6$ ..................... B29C 65/00
[52] U.S. Cl. .......... 156/304.4; 156/163; 156/164; 156/229; 156/247; 156/304.3
[58] Field of Search ................. 156/66, 304.1, 156/304.3, 304.4, 304.6, 247, 163, 164, 229; 428/40, 41, 42, 62, 347, 354

[56] References Cited

U.S. PATENT DOCUMENTS

| | | | |
|---|---|---|---|
| 1,917,430 | 7/1933 | Clark | 156/304.4 |
| 3,127,303 | 3/1964 | Neuhauser et al. | 161/39 |
| 3,523,176 | 8/1970 | Hill | 219/245 |
| 3,533,876 | 10/1970 | Burgess | 156/304.4 |
| 3,582,436 | 6/1971 | Bucher | 156/502 |
| 3,651,305 | 3/1972 | Shimota | 219/243 |
| 3,660,191 | 5/1972 | Shimota et al. | 156/152 |
| 3,661,669 | 5/1972 | Cairns | 156/157 |
| 3,927,289 | 12/1975 | Prater | 219/245 |
| 3,969,564 | 7/1976 | Carder | 428/212 |
| 3,972,768 | 8/1976 | Hill | 156/545 |
| 4,075,377 | 2/1978 | Aitchison et al. | 428/95 |
| 4,172,860 | 10/1979 | Feeney et al. | 525/97 |
| 4,199,646 | 4/1980 | Hori et al. | 428/344 |
| 4,415,087 | 11/1983 | Clayton et al. | 206/632 |
| 4,416,713 | 11/1983 | Brooks | 156/304.4 X |
| 4,420,518 | 12/1983 | Progar | 428/40 |
| 4,438,323 | 3/1984 | Milnes | 219/243 |
| 4,525,233 | 6/1985 | Brooks | 156/304.4 X |
| 4,536,244 | 8/1985 | Greci et al. | 156/304.4 |
| 4,545,843 | 10/1985 | Bray | 156/322 |
| 4,551,388 | 11/1985 | Schlademan | 428/355 |
| 4,557,774 | 12/1985 | Hoopengardner | 156/71 |
| 4,581,269 | 4/1986 | Tilman | 156/304.4 X |

(List continued on next page.)

FOREIGN PATENT DOCUMENTS

| | | | |
|---|---|---|---|
| 1567632 | 5/1980 | United Kingdom | 156/304.4 |

OTHER PUBLICATIONS

Sponge Cushion, Inc. Brochure entitled *SCI Dubl–Stik Carpet Installation System* dated 1986 (lower right–hand corner of last page).

Sponge Cushion, Inc. Brochure entitled *Installation Instructions for Tred–Mor and Vigilant Series—Director and Class A Commercial Contract Cushion* dated Jun. 30, 1987.

*Primary Examiner*—Melvyn Andrews
*Assistant Examiner*—Paul M. Rivard
*Attorney, Agent, or Firm*—Medlen & Carroll, LLP

[57] ABSTRACT

A method and apparatus is provided for installing face seamed stretched carpet, wherein the carpet seam is adhesively bonded to the floor or other substrate after stretching to eliminate peaking and profiling. A flexible, tear resistant release liner is used to isolate the adhesive used for bonding the seam to the floor, to prevent bonding prior to stretching of the seamed carpet. Once seaming is complete, the carpet can be stretched and anchored, and the release liner can be easily pulled out from underneath the stretched carpet to expose the adhesive, and the seam can be bonded to the floor simply by applying pressure to the top surface of the seam area along the entire length of the seam. Pressure sensitive type adhesives have been found to be particularly effective for use in this method because they form immediate bonds which enable the carpeting process to proceed without delay, because they form elastic bonds which can accomodate normal shifting of the carpet which occurs with changes in temperature and humidity, and because the bond can be often be reestablished, if it is broken, by simply applying pressure.

22 Claims, 3 Drawing Sheets

U.S. PATENT DOCUMENTS

| | | | |
|---|---|---|---|
| 4,584,040 | 4/1986 | Anderson | 156/152 |
| 4,699,686 | 10/1987 | Franke | 156/579 |
| 4,726,867 | 2/1988 | Gustavsen | 156/304.4 |
| 4,749,433 | 6/1988 | Johnston et al. | 156/304.4 |
| 4,895,738 | 1/1990 | Zimmerman et al. | 427/208.8 |
| 4,919,743 | 4/1990 | Johnston et al. | 156/304.4 |
| 5,160,770 | 11/1992 | Hoopengardner | 428/40 |
| 5,198,300 | 3/1993 | Matthews et al. | 428/354 |
| 5,225,470 | 7/1993 | Mancinelli | 524/271 |
| 5,453,150 | 9/1995 | Hoopengardner | 156/304.4 X |

METHOD AND APPARATUS FOR SEAMING CARPETS

REFERENCE TO RELATED APPLICATION

This application is a continuation-in-part of U.S. patent application Ser. No. 08/206,030 filed Mar. 3, 1994, now U.S. Pat. No. 5,376,419 which is a continuation of U.S. patent application Ser. No. 07/867,126, filed Apr. 10, 1992, now abandoned which is a continuation application of U.S. patent application Ser. No. 07/522,263 filed May 11, 1990, which issued as U.S. Pat. No. 5,104,475.

FIELD OF THE INVENTION

The present invention relates to carpet installation. More particularly, this invention relates to methods and apparatus for seaming and installing wall-to-wall carpets so as to avoid seam peaking.

DISCUSSION OF THE PRIOR ART

In the installation of wall-to-wall carpet, seaming is employed to join the adjacent abutting edges of carpeting. It is common for installers to join seams using a face seaming technique. Using this technique, the carpet pieces to be joined are laid onto the floor with the carpet backing facing the floor, with the abutting edges of the carpet pieces folded back. Conventional carpet seaming tape, having hot melt adhesive applied to the upper surface of a backing material, such as that described in U.S. Pat. No. 3,533,876 (Burgess, 1970) is centered along the length of the carpet edges to be joined with the backing to the floor and the hot melt adhesive facing the carpet backing. A hot iron is moved longitudinally along the length of the carpet seaming tape to melt the adhesive, and the backing of the carpet pieces is pressed down onto the tape, with the edges of the carpet pieces abutting, to form a closely fitting seam as the adhesive cools.

Wall-to-wall carpet is usually installed either by gluing the carpet down or by stretching the carpet and attaching it in place using tack strips. The face seaming technique can be utilized in glue down as well as stretched tack strip installations.

In "glue down" wall-to-wall installations, carpet is adhesively attached directly to an underlying substrate, such as a floor or other surface, or to a carpet cushion which itself has been attached to the floor or other surface. This involves covering the entire surface of the substrate with an adhesive and laying the carpet into the adhesive so that the backing of the carpet bonds to the substrate. "Glue down" installations are popular because they avoid the need for stretching the carpet and are particularly effective for large area installations.

In order to provide carpets with a permanent seam using hot melt adhesive in the "glue down" method, one of two methods is generally used. The carpet seaming tape can be laid into the adhesive in the vicinity of the seam so that the backing of the carpet seaming tape is bonded to the substrate with the hot melt adhesive up. When the hot iron is moved longitudinally along the length of the carpet seaming tape to melt the hot melt adhesive, and the carpet pieces are pressed down onto the tape with the edges of the carpet pieces abutting, the seam between the carpet pieces is formed as the adhesive cools. However, the heat applied to conventional seaming tape to melt the hot melt adhesive is often transmitted to, and is sufficient to degrade, the multipurpose adhesive used to bond the carpet backing to the substrate. This causes separation of the carpet from the underlying substrate in the vicinity of the seam, and results in an unsightly raised area along the length of the seam. This can be avoided by seaming the carpet first, but seaming first requires the installer to move relatively large sections of seamed carpet when coating the substrate with adhesive, an impractical and time-consuming alternative especially when large areas are to be carpeted.

Stretched carpet installation consists of anchoring an edge of the carpet onto a tack or tackless strip positioned along the periphery of the area to be carpeted, such as along one side of the room. This is followed by stretching the carpet away from the anchored edge (for example, towards the opposite wall in a room) and anchoring the opposite edge of the carpet onto tack or tackless strips.

It is known to those skilled in the art that seam "peaking" is a common problem in stretched carpet installation. See, e.g., U.S. Pat. No. 4,919,743 (Johnson et al., 1990). Seam peaking occurs when the abutting edges of the carpet at a seam form a relatively sharp ridge. Seam peak ridges are unsightly and typically result in excessive wear at the seam. Seam peaking may result from the use of excessive heat during seam sealing, or from the tension which is put on the carpet during stretching. Johnson '743 and U.S. Pat. No. 4,749,433 (Johnson et al., 1988) disclose the use of enhanced width seaming tape. However, such tape is expensive to use and may not eliminate entirely the peaking problem.

Many efforts have been made to combat seam peaking, including the enhanced width tape disclosed by Johnson, as well as tapes having steel rods, bars or wires which are placed transversely to the seam line. These solutions do not work in every instance, with all kinds of carpets. Indeed, some of the most expensive carpets, such as Berber carpets, continue to exhibit peaking even after the above methods have been used to prevent peaking.

One method used to alleviate peaking involves coating the carpet cushion along the seam line, and under the conventional carpet seaming tape, with a multipurpose adhesive, so that the seam will be bonded to the carpet cushion. This method is problematical at best. The carpet must be seamed rapidly, before the adhesive cures. If the adhesive has not cured, the finished seam will still be movable with respect to the multipurpose adhesive, and it may still be possible to stretch the carpet and establish a bond. Once cure occurs, stretching, or other movement of the carpet, can break the bond between the seaming tape and the cushion. Cured multipurpose adhesive has almost no "give" and tends to form rigid rather than flexible bonds. Thus, when broken, the multipurpose adhesive bond cannot be reestablished by recontacting the seaming tape and the adhesive. Finally, and most importantly, carpet seaming irons generate sufficient heat to degenerate multipurpose adhesive, making this method extremely unreliable, since seaming the carpet can adversely affect the establishment of a bond between the seam and the cushion. As an alternative, the carpet can be seamed first using hot melt seaming tape, followed by folding the seamed carpet back, applying multipurpose adhesive to the cushion, replacing the seamed carpet, stretching and then applying pressure to the top surface of the carpet to form a bond. This method is, however, disadvantageous in that it requires the manipulation of relatively large sections of seamed carpet.

Seam "profiling" is another problem which we have encountered in stretched carpet installations, and one which has apparently not been recognized in the literature or solved by any of the conventional seaming tapes designed to prevent peaking. Profiling occurs where the carpet surface which is directly over the seaming tape bulges during or following stretching to produce a longitudinal mound along the seam which is typically as wide as the seaming tape which is used. Thus, if an installer uses a wider tape, such as a 6" tape, to combat seam peaking, the seam peaking may be avoided, but the installer ends up with a "profile" which is typically about 6" wide all along the seam. The cause of profiling is not known with certainty, but we believe the absorption of hot melt adhesive into the backing of the carpet reduces the flexibility of the backing, causing bulging when the carpet is stretched. In studying this problem, we have bonded conventional hot melt seaming tapes to the backing of carpets in areas other than the seams and have produced profiling in those areas as well.

Accordingly, the need exists for a carpet seaming tape and method of stretched carpet installation that substantially reduces or eliminates both seam peaking and profiling.

SUMMARY OF THE INVENTION

The present invention provides a method for seaming carpets which substantially prevents or reduces seam peaking and profiling when carpets are installed using a stretched carpet method.

In one embodiment the present invention provides a method of installing face seamed stretched carpet wherein the carpet seam is adhesively bonded to a floor or substrate using a carpet seaming tape having a layer of hot melt adhesive on one side and a layer of pressure sensitive adhesive on the other side, such as that disclosed in our U.S. Pat. No. 5,104,475, which is incorporated herein by reference. A release liner or other barrier covers the pressure sensitive adhesive on the seaming tape to prevent the tape from bonding the seam to the surface prior to stretching the carpet. The carpet pieces are seamed by centering the carpet seaming tape under the abutting edges of carpet along the seam with the hot melt adhesive facing up, and using a conventional carpet seaming iron to melt the hot melt adhesive on the top surface of the carpet seaming tape and pressing the abutting carpet edges into the molten hot melt adhesive. The carpet is then conventionally stretched by anchoring one edge of the carpet to tack or tackless strips mounted around the periphery of the area to be carpeted such as, for example, along one wall in a room, and stretching the opposite edge of the seamed carpet away from the anchored edge. The stretched edge can then be anchored in a similar fashion on tack or tackless strips. After stretching, the release liner is removed, and the seam is pressed into contact with the surface being carpeted, forming a bond between the seam and the surface which substantially reduces or eliminates seam peaking and profiling.

In still another embodiment the present invention provides a carpet seaming tape having a reinforced release liner for easy removal of the release liner after stretching of the carpet.

In yet another embodiment the present invention provides a method for carpet installation whereby a durable, reusable release liner is used to cover a layer of pressure sensitive adhesive, located either on the carpet seaming tape or on the carpet cushion, until after the carpet is stretched to permit the creation of a bond between the carpet backing at the seam and the cushion or floor after the carpet has been stretched.

Other and further objects, features, advantages and embodiments of the present invention will become apparent to one skilled in the art from reading the detailed description of the invention together with the drawings.

DETAILED DESCRIPTION OF THE INVENTION

Figure 1:
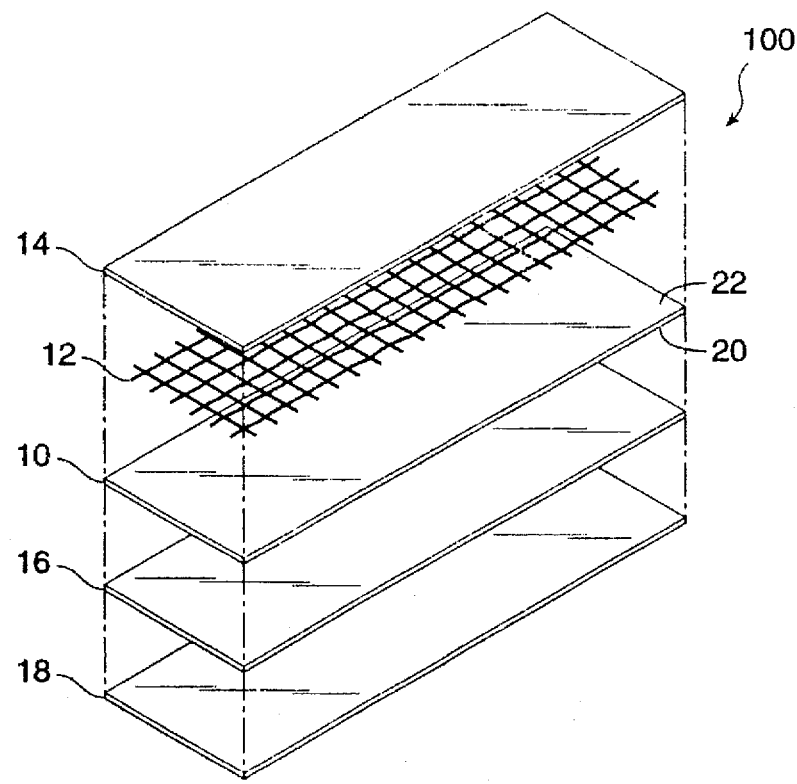
FIG. 1 is an exploded perspective view of a carpet seaming tape of the present invention.

FIG. 1 shows a hot melt carpet seaming tape 100 which can be used in the present invention. The tape 100 preferably includes a carrier 10. Carrier 10 can be formed from paper, heat resistant film, conventional scrim material, or even from a relatively thin layer of hot melt adhesive. The function of the carrier 10 is simply to provide a surface for attaching the hot melt adhesive until it can be used to seam the carpet.

A layer of hot melt adhesive 14 is bonded to a first side 22 of the carrier 10. Any hot melt adhesive suitable for seaming carpets can be used. Many types of hot melt adhesives are suitable, and are known to those having skill in the art or are described in detail in the art. For example, see U.S. Pat. No. 3,533,876 (Burgess, 1970) which is incorporated herein by reference.

If desired, a reinforcing scrim 12 can be bonded to the first side 22 of the carrier 10 between the carrier and the layer of hot melt adhesive 14. Alternatively, and less preferably, scrim 12 might be bonded to a bottom surface 20 of carrier 10 (for example, where carrier 10 is constructed from a thin layer of hot melt adhesive) or to a top surface of the hot melt adhesive layer 14. Scrim 12 can also be used as the carrier 10, or can be omitted altogether. The use of a reinforcing scrim 12 is most preferred when carrier 10 is formed from paper, film or hot melt adhesive. Such scrims are well known in the art and can be constructed from yarn, fibers or mesh of natural or synthetic fibers such as, for example, cotton, nylon, rayon, or fiberglass, or from metallic filaments.

A layer of pressure sensitive adhesive 16 is bonded to the second side 20 of the carrier 10. This pressure sensitive adhesive 16 is preferably a thermoplastic type heat-resistant adhesive. H.B. Fuller Co. adhesive # HM 8340 was found to be satisfactory for this purpose. Pressure sensitive adhesive 16 is preferably covered by a releasable film 18 during manufacture and prior to use to permit unimpeded rolling, unrolling and handling of the tape. Releasable film 18 is coated or impregnated to prevent adhesive bonding to the surface of the film. Suitable release coatings are known to those skilled in the art and can, for example, be based on silicone compositions.

Figure 2:
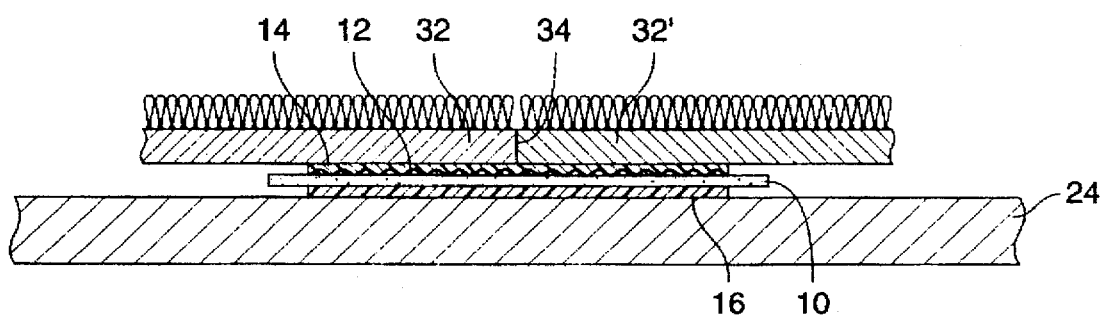
FIG. 2 is a cross-sectional view of a carpet installed over a floor according to a method of the present invention.
Figure 3:
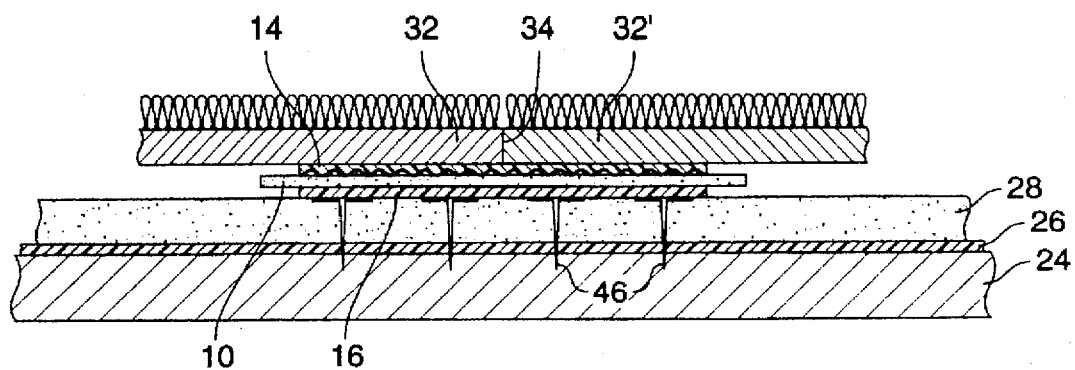
FIG. 3 is a cross-sectional view of a carpet installed over a carpet cushion according to a method of the present invention.

A typical carpet installation is shown in FIGS. 2 and 3. As shown in FIG. 2, the carpet 32 is unrolled over the top of a floor or other surface 24, preliminarily fitted and trimmed as necessary. It should be noted that carpets can be installed on a variety of surfaces other than floors. Thus, the term "floor" as used herein is intended to include any surface which can be carpeted using conventional installation methods. As shown in more detail in FIG. 3, and as discussed in more detail below, this surface can include a conventional carpet cushion 28.

After fitting and trimming of the carpet pieces 32, 32', a carpet seaming tape of the present invention, as shown in FIG. 1, can be unrolled and centered along each desired seam beneath and between the abutting pieces of carpet 32, 32' which form the seam 34, with the release liner 18 on the floor 24. When the carpet seaming tape has been properly positioned, a conventional electric seaming iron or other means for melting the hot melt adhesive 14 can then be placed under the abutting edges of the carpet pieces 32 and 32' and moved along the length of the carpet seaming tape to melt the hot melt adhesive 14 on the carpet seaming tape. As the seaming iron moves past, the abutting edges of the carpet are then pushed into engagement with each other and into the molten adhesive. The seam is formed when the molten adhesive cools. The carpet can then be stretched conventionally by anchoring one edge of the carpet to tack or tackless strips disposed on one side of the area to be carpeted (such as, for example, along a wall in a room), and by stretching an opposite edge of the carpet away from the anchored edge towards the opposite side of the area to be carpeted, and by anchoring the opposite edge on tack or tackless strips disposed along the opposite side of the room. Stretching and anchoring occur along each wall in the room; however, an unanchored space somewhat wider than release liner 18 is left for removal of the release liner 18. Following stretching, the release liner 18 is removed from the tape 100, and pressure is applied to the seam area to push the pressure sensitive adhesive layer 16 into contact with the floor 24, bonding the carpet backing along the seam to the floor, thus alleviating or preventing any seam peaking or profiling following stretching. Lastly, the space through which release liner 18 was removed is anchored.

As shown in FIG. 3, the method and apparatus of the present invention can also be used advantageously in wall-to-wall carpet installations in which a carpet cushion 28 is interposed between the carpet 32 and the floor 24. It should be noted that the use of a carpet cushion 28 is typically desirable to reduce carpet wear. For the methods encompassed by this invention, it is preferred that a cushion be used which meets the Carpet and Rug Institute ("CRI") Standards # 104 and # 105. A 7/16 inch thick pad with a density of 5 pounds (per cubic foot) or more has been found to provide an acceptable installation in conjunction with the method described herein. Where less "stiff" or dense cushions are used for installing carpet, we believe the tendency to peak or profile should be substantially reduced if the stiffness of the carpet seaming tape carrier 10 is increased, to spread the force which produces the peaking or profiling over a wider area.

Figure 6:
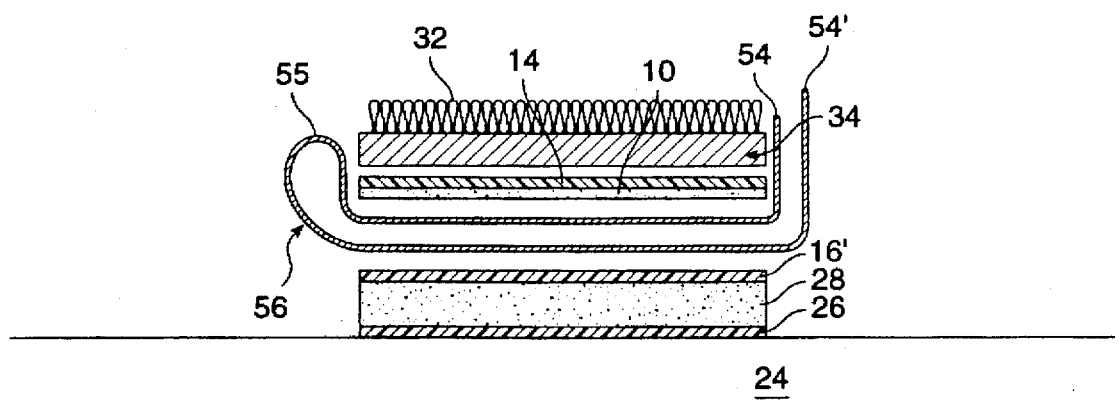
FIG. 6 is an exploded cross-sectional view along the seam of a release liner positioned for remote removal from over a layer of adhesive placed on the top surface of a carpet cushion; and, FIG. 7 is a perspective view of a carpet seaming tape having a layer of pressure sensitive adhesive facing and substantially centered on a wider release liner to form marginal edges.

To install carpet cushion 28, the cushion is unrolled, fitted and rough cut as necessary. The entire carpet cushion 28 can, but need not, be bonded to the floor, as shown in FIG. 6. If bonding of the carpet cushion is desired, the rough fitted cushion is removed and floor 24 can be completely coated with an adhesive 26, which can be, for example, pressure-sensitive or multipurpose adhesive. The carpet cushion 28 can then be replaced over the adhesive 26, and when the adhesive cures, the cushion 28 will be adhesively attached to the floor 24. Where time is of the essence, it may be more desirable to use a carpet cushion, such as that disclosed in U.S. Pat. No. 4,557,774 to Hoopengardner (which is incorporated herein by reference), which has a pre-applied pressure sensitive adhesive on one side covered by a releasable film to permit handling and movement before use. This type of carpet cushion can be fitted with the release film side against the floor, cut to size and easily installed by simply folding back the cushion a section at a time, removing the release film, replacing the section of the carpet cushion on the floor with the pressure sensitive adhesive facing the floor, and applying pressure to adhesively attach the cushion to the floor.

Once the carpet cushion 28 is in place, the carpet can then be unrolled over the top of carpet cushion 28, and the carpet pieces 32, 32' can be fitted and trimmed as necessary to form a seam 34, as shown in FIGS. 2 and 3. The area of the seams can be marked, if desired, on cushion 28. If the entire cushion was not bonded to the floor as discussed above, the cushion area underlying the expected carpet seam must be securely fastened to the floor using conventional means such as, for example, adhesive and/or tacks 46, as shown in FIG. 3. Most preferably, the cushion area underlying the seam is completely and continuously bonded to the floor. Typically, an area of cushion about two (2) inches to about three (3) inches on each side of the expected seam line is securely attached or bonded to the floor, for the entire length of the seam. While multipurpose adhesive can be used for bonding the cushion to the floor, it takes a significant amount of time to cure (typically thirty (30) minutes to an hour or more). Alternatively, and more advantageously, the cushion can be bonded to the floor using a strip of five (5) inch or six (6) inch wide double sided pressure sensitive adhesive tape or film centered on the seam line. This method has the advantage of forming an immediate bond between the cushion and the floor on contact. Once the cushion has been bonded, at least in the seam areas, the carpet can be replaced over the cushion.

A carpet seaming tape of the present invention can then be unrolled and centered beneath and along each desired seam between the abutting pieces of carpet 32, 32' with the release film 18 facing the cushion. When the carpet seaming tape 100 has been properly aligned, a seam 34 can be formed using a conventional electric seaming iron as described above. The carpet is then conventionally stretched and anchored, as discussed above, leaving an unanchored gap along the edge of the carpet for removing the protruding release liner 18 (or an attached means for pulling the release liner 18). Following stretching and anchoring, the release liner 18 is removed, the unanchored gap is anchored, and pressure is exerted against the top of the seamed carpet 32, 32' in the area of the seam 34 to force the pressure sensitive adhesive layer 16 into intimate contact with the top surface of the cushion 28, bonding the seam 34 to the portion of cushion 28 which, in turn, is bonded securely to surface 24, thereby alleviating the tendency to peak or profile.

As one skilled in the art will appreciate, removing the release film 18 after stretching can present some difficulties, since conventional release films are typically constructed from silicone coated paper which tears easily. Thus, remote removal from one end of the seam would ordinarily be problematical at best. The method of the invention provides several solutions to this problem.

Figure 4:
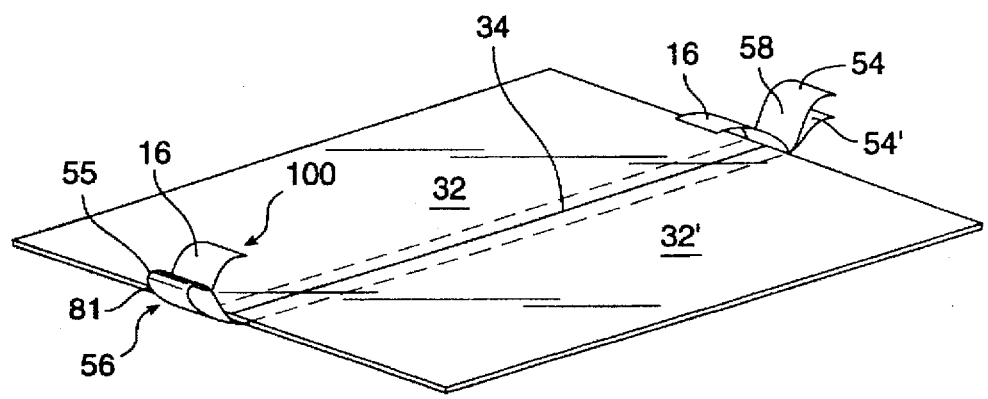
FIG. 4 is a perspective view of a release liner of the present invention positioned for removal following seaming and stretching.
Figure 5:
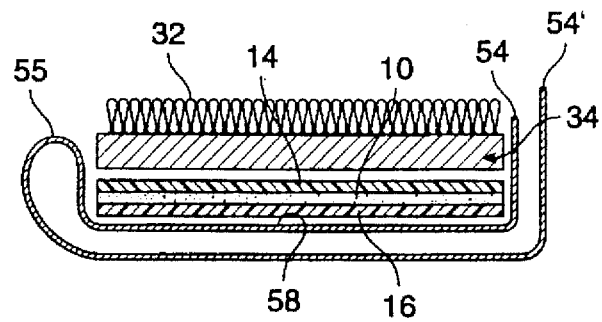
FIG. 5 is an exploded cross-sectional view along the seam of a release liner positioned for remote removal from under a carpet seaming tape having a layer of adhesive facing the release liner.

The preferred solution is illustrated in FIGS. 4 and 5. In this embodiment, the original release liner 18 is removed from the pressure sensitive adhesive layer 16 of tape 100, and replaced with a release liner 56 which has a high tear strength and is durable, flexible and preferably reusable. Release liner 56 can be formed, for example, from thermoset elastomers (e.g. silicone rubber). Such material can be easily formed in sheets and slit to the desired width. For example, commercially available belting material, such as Specialized Sales Co. # RSB-025 Silicone/Fiberglass or Greenbelt Industries, Inc. # S/W 23 Silicone Coated Fabric, can be used.

Figure 7:
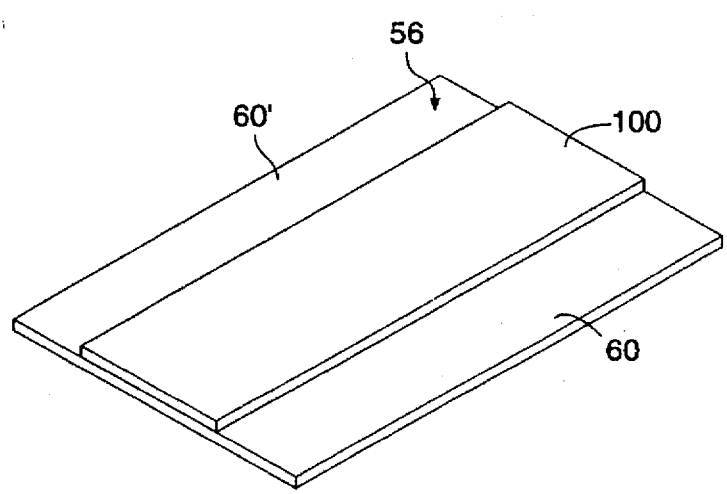

Alternatively, release liner 56 can be constructed from any durable, flexible material such as, for example, plastic sheet material, reinforced plastic films, or thin metal strips. Release liner 56 can be coated or impregnated with a conventional release compound, such as silicone compositions, or any other suitable release agent, to enable the liner 56 to be pulled free from the pressure sensitive adhesive layer 16 when desired. The release liner 56 is preferably constructed to be wider than the carpet seaming tape with which release liner 56 will be used. As shown in FIG. 7, this additional width provides a non-stick surface (marginal edges 60, 60') for capturing any hot melt adhesive which runs off the carpet seaming tape during seaming, thus preventing the premature bonding of the seam to the floor 24 or cushion 28 before stretching.

To use release liner 56, the carpet 32, 32' is unrolled over the top of the floor, fitting and trimming the carpet pieces as necessary. The areas where the seam lines are located are noted, and may be marked on the cushion or floor if desired. The abutting edges of the carpet pieces 32, 32' are folded back from the seam area and release liner 56 is placed along the entire length of the seam. The release liner 56 is most preferably folded onto itself, as shown in FIGS. 4 and 5, so that the two ends 54, 54' of the release liner 56 extend beyond one edge of the carpet 32 at an end of the seam and the fold 55 in the release liner 56 is located beyond the other edge of the carpet at the other end of the seam. This arrangement provides a double layer underneath the carpet 32, 32', with a release coated surface 58 contacting the bottom surface of the carpet.

Once the reusable release liner 56 is positioned, the manufacturer's release liner 18 from a suitable length of, for example, carpet seaming tape 100 can be removed and discarded, exposing the pressure sensitive adhesive layer 16. The carpet seaming tape can then be centered on the seam line (which should correspond with the approximate location of the longitudinal axis of the release liner 56) and placed onto the reusable release liner 56 with the pressure sensitive adhesive layer 16 facing the release coated surface 58 of the release liner 56, as shown in FIG. 4. As shown in FIG. 7, if the release liner 56 is wider than the carpet seaming tape 100, a marginal edge 60, 60' will be provided on the surface 58 along either side of the tape 100 where the tape 100 does not cover the surface 58. As noted above, the marginal edges 60, 60' will permit capture and removal of any hot melt adhesive runoff produced during seaming. Should any adjustment in the centering of the carpet seaming tape 100 with respect to the seam line 34 be required, such adjustment can then be easily accomplished by manipulating the release liner 56.

With the carpet seaming tape 100, and attached reusable release liner 56, in position, the abutting edges of carpet 32, 32' can be returned to their original position over the carpet seaming tape 100. The seam 34 can then be formed conventionally, as described above, by using a seaming iron to melt the hot melt adhesive layer 14, and by pressing the abutting edges of the carpet 32, 32' into the molten adhesive. After the adhesive has cooled and solidified, the carpet can be stretched and anchored. The release liner 56 can then be easily removed simply by pulling on the end 54', as shown in FIG. 5. As the slack is taken up, the fold 55 is pulled under the edge of the carpet, and along the underneath of the seam towards the ends 54, 54'. The release liner 56 is released from the pressure sensitive adhesive layer 16 as the fold 55 is pulled from its original position shown in FIGS. 4 and 5 towards the end 54. Complete removal of the release liner 56 exposes the pressure sensitive adhesive layer 16 on the bottom surface of the carpet seam. Installation is completed by pressing the seam to the floor 24 or cushion 28, to adhesively bond the seam 34 to the floor 24.

Alternatively, but less desirably, the manufacturer's release liner 18 can be reinforced to enable it to be remotely removed from one end of the seam. For example, strapping tape or fiber reinforced tape can be placed over the outer surface of release liner 18, and extended well beyond the end of the length of the seaming tape to form a pulling mechanism which can be folded back under the carpet seaming tape in the same manner as was done with the release liner 56 in FIGS. 4 and 5, so that pulling on an end of the reinforcing tape will remove the release liner 18 in a single piece. It would likely also be possible to use reinforcing tape which covers the release liner 18, but does not extend substantially beyond the ends of the release liner 18, if a pulling means such as a string, line, cord, ribbon or strap is securely attached to one end of the reinforcing tape. Such pulling means can be formed from, for example, fiberglass, cotton, jute, sisal, polyester, nylon, and metal. This will provide a similar mechanism which can be folded under the reinforced release liner 18 at one end of the seam and extended beyond the opposite end of the seam where it can be pulled to effect removal of the reinforced liner 18 from under the completed and stretched carpet seam.

Of course, it would also be possible to manufacture a carpet seaming tape 100 with a durable, tear-resistant release liner 18. Such a liner could be constructed from any relatively thin, flexible material having a high tear strength. A removal means for remotely removing the release liner would also have to be provided, either by the manufacturer or by the user, and could be attached to the end of the release liner or could be integrated into the release liner (for example, the removal means could be a string integrally woven into the release film).

The method of the invention can also be easily be adapted for use where it is desirable to use conventional carpet seaming tape, that is, carpet seaming tape which does not include a layer of pressure sensitive adhesive 16 on the bottom surface of the tape carrier, provided that any non-stick coatings are removed from the bottom surface of the tape carrier. Such non-stick coatings are typically provided on conventional carpet seaming tapes and can be removed, for example, by lightly sanding or abrading the back surface of the carrier. With this method, a layer of adhesive must be provided to bond the carpet backing along the seam line to the cushion or the floor.

As shown in FIG. 6, a cushion 28, if desired, is installed and bonded to the floor 24 (at least in the region of the seams) as previously discussed. A layer of pressure sensitive adhesive 16' can be provided on the top surface of the carpet cushion 28 along the seam line, for example by bonding a strip of double sided pressure sensitive adhesive tape or film to the top surface of the carpet cushion along the seam line. The exposed, top surface of the pressure sensitive adhesive layer 16' can be covered with a release liner 56, which is folded over itself so that a loop 55 is formed at one end of the seam and the two ends 54, 54' extend from the other end of the seam, in the same manner as discussed above for FIGS. 4 and 5. The width of the pressure sensitive adhesive layer can vary from about as wide as the carpet seaming tape to slightly less than the width of the release liner 55. The conventional carpet tape can be laid over the double layer of the release liner 56, and centered under the seam line, with the layer of hot melt adhesive 14 facing the carpet backing, and the carrier 10 resting on the top surface of the release liner 56. The seam is conventionally formed using a seaming iron. After stretching and anchoring the carpet, the release liner 56 can be removed from the pressure sensitive adhesive layer 16' on the carpet cushion 28 by pulling the top end 54 to remove the slack and pull the fold 55 towards ends 54, 54'. When the liner has been removed, the carpet seam can be bonded to the cushion 28 by pressing the area of the carpet around the seam line down into contact with the pressure sensitive adhesive 16'.

Alternatively, it is possible to add a layer of pressure sensitive adhesive to the bottom of any conventional carpet seaming tape, for example, by using a double sided pressure sensitive adhesive tape or film which is about as wide as the carpet seaming tape, provided that any non-stick coatings on the carrier have been removed. The method described above for tape 100, and illustrated in FIG. 5, can then be used. This method also enables the user to select any conventional carpet seaming tape desired for use in the method of the invention.

As a further alternative, it would also be possible to place a layer of pressure sensitive adhesive on both sides of the carpet cushion in the region of the seam, and to use a release liner 56 as described above to isolate the adhesive on the bottom surface of the carpet cushion, with the top surface of the carpet cushion bonded to the carpet seam before stretching. Following stretching and anchoring, the release liner 56 is removed, as described above, and the bottom surface of the carpet cushion is bonded to the floor.

Less desirably, it is also possible to coat the top surface of the cushion underlying the seam with a liquid, multipurpose adhesive. As noted above in the prior art section, the method as conventionally practiced is very unreliable. To avoid many of the problems of the prior method, we have found it advantageous to use a release liner, such as release liner 56 shown in FIG. 6. The release liner can be folded back on itself, as described in detail above, and placed over the wet multipurpose adhesive on the top surface of the cushion in the area of the seam. The release coated bottom surface of the bottom fold of the release liner contacts the wet multipurpose adhesive. The release liner 56 effectively insulates the wet multipurpose adhesive from the heat of the seaming iron and the molten hot melt adhesive, and thus helps prevent premature curing.

The carpet seaming tape can then be centered on the top surface of the release liner 56 with the hot melt adhesive 14 facing the carpet backing and the carrier 10 resting on top of the release liner 56. If the release liner is wider than the carpet seaming tape, the carpet seaming tape will not cover the marginal edges of the release liner, and the marginal edges 60, 60' of the release liner will capture any hot melt adhesive which flows off the carrier 10 during seaming. Conventional seaming and stretching can then be performed as discussed in more detail above. After the carpet is stretched and anchored, the release liner 56 can be removed from the multipurpose adhesive layer by pulling on the end 54, exposing the wet multipurpose adhesive to the underside of the seam. Pressure can then be applied to the top surface of the carpet seam to press the carpet backing in the region of the carpet seam into the wet multipurpose adhesive until the adhesive cures, resulting in an adhesive bond between the seam and the cushion, floor or other substrate.

However, even with the use of the release liner, which now makes the production of reliable bonds with multipurpose adhesive possible, this method is not preferred. Multipurpose adhesives are liquids, and messy to use. They also often contain solvents which are known to pollute the environment and present health hazards. Unlike pressure sensitive adhesive, cured multipurpose adhesive has almost no "give" and tends to form rigid rather than flexible bonds. When broken, the multipurpose adhesive bond cannot be reestablished, as pressure sensitive adhesive bonds can often be, by recontacting the seaming tape and the adhesive. Accordingly, the preferred adhesives for use in the method of the present invention are pressure sensitive adhesives.

Adhesives other than the ones described above can be used to create an adhesive layer between the top surface of the cushion and the bottom surface of the carrier 10 or the carpet backing along the seam line. For example, a two part adhesive could be used which develops a bond when the two parts are brought into contact with each other. This could be done, for example, by coating the top surface of the cushion along the seam line with a first part of the adhesive, and by coating the bottom surface of the carrier 10 of the carpet seaming tape with a second part of the adhesive, and using a release liner placed over the first part of the adhesive to isolate the first part of the adhesive from the second part. After seaming and stretching, the release liner could be removed remotely, as discussed above, and the carpet backing (with the attached second adhesive part) along the seam pressed into the first adhesive part underlying the seam on the cushion to cure the adhesive and form the bond.

The methods described above provide the following important advantages compared with prior art installation methods. The adhesive bond between the bottom surface of the seam and the floor or cushion substantially reduces or eliminates peaking and profiling. We have also found that when pressure sensitive adhesive is used to create that bond, the bond has sufficient plasticity to allow the minor carpet movements of the stretched carpet which are due to ambient moisture or temperature changes thus preserving the carpet's smooth, taut surface. Furthermore, if the bond between seam and cushion or floor is broken, it can, in many cases, be reestablished by applying pressure to the seam area.

Having described the invention in detail and by reference to preferred embodiments thereof, it will be apparent to those skilled in the art that modifications and variations are possible without departing from the scope of the invention defined in the claims.

We claim:

1. A method for installing carpeting in which pieces of carpet having abutting edges are seamed to form an expanse of carpeting on a surface to be carpeted, said method comprising the steps:

fitting together at least two pieces of carpet with abutting edges to form a seam line, said carpet having a backing side and a pile side and positioned with the backing side facing the surface to be carpeted;

selecting a length of carpet seaming tape for forming a seam between substantially the entire length of the abutting edges, said carpet seaming tape having a carrier, a layer of hot melt adhesive on a first side of said carrier, and a second side of said carrier;

providing a second adhesive for bonding said second side of said carrier to the surface to be carpeted;

isolating said second adhesive using a removable isolation means for preventing an exposed surface of said second adhesive from bonding together said carrier and said surface to be carpeted;

placing said length of carpet seaming tape beneath and centered substantially between said abutting edges with the hot melt adhesive facing said backing side of said carpet pieces, and said second side of said carrier facing the surface to be carpeted;

forming a seam between the abutting edges of the carpet by melting the hot melt adhesive and pushing the abutting edges of carpet into contact with each other and with the hot melt adhesive;

stretching the seamed carpet and anchoring the edges of the carpet to anchor means placed about the periphery of the surface to be carpeted;

removing the isolation means; and, pressing down on the pile side of carpet along the seam line to bond the second side of the carrier to the surface to be carpeted.

2. The method of claim 1 wherein said second adhesive is a layer of pressure sensitive adhesive.

3. The method of claim 2 wherein said second adhesive is located on the second surface of said carrier.

4. The method of claim 2 wherein said second adhesive is located on the surface to be carpeted.

5. The method of claim 1 wherein said isolation means is a release liner, said release liner characterized by its flexibility and high tear strength.

6. The method of claim 5 wherein said release liner is sufficiently long to enable it to be folded over on itself whereby a fold is located at one end of said abutting carpet edges and the two ends of said release liner are located at an opposite end of said abutting carpet edges, and whereby removal of said release liner is obtained by pulling on one of said two ends of said release liner.

7. The method of claim 5 wherein said release liner is provided with a separate means for removal which enables the release liner to be removed from one end of said seam.

8. The method of claim 5 wherein said release liner is wider than said carpet seaming tape.

9. The method of claim 1 wherein said surface to be carpeted is a carpet cushion on a substrate.

10. The method of claim 9 additionally including the step of firmly attaching said cushion to said substrate at least in the area underlying said second adhesive means before placing said carpet seaming tape on said surface to be carpeted.

11. A method for installing carpeting in which at least two pieces of carpet, each of which have a pile surface, a backing surface, and an edge, are placed together with their edges abutting and seamed together along the abutting edges using a carpet seaming tape having a carrier with a first and second surface, a layer of hot melt adhesive on said first surface of said carrier, and a layer of pressure sensitive adhesive on said second surface of said carrier, the method comprising the steps laying the carpet pieces on the surface to be carpeted with the backing surface resting on the surface to be carpeted, and the edges abutting each other to form a seam line;

approximately centering the carpet seaming tape under said abutting edges along the seam line with the hot melt adhesive layer facing the backing surface and the pressure sensitive adhesive layer facing the surface to be carpeted;

melting the hot melt adhesive, and pushing the abutting edges into contact with each other and the hot melt adhesive to form a seam;

stretching and anchoring the seamed carpet; and, applying pressure to said pile side of said carpet along said seam to push said pressure sensitive adhesive into contact with said surface to be carpeted, creating a bond between said seam to said surface to be carpeted.

12. The method of claim 11 wherein said pressure sensitive adhesive layer is covered by a tear-resistant release liner and additionally including the step of removing the release liner prior to applying pressure to said pile side of said carpet to push said pressure sensitive adhesive into contact with said surface to be carpeted.

13. The method of claim 12 additionally including the step of placing the release liner on the surface to be carpeted and centered under the abutting edges before the carpet seaming tape is centered under the abutting edges, whereby said pressure sensitive adhesive layer rests on said release liner.

14. The method of claim 13 wherein said release liner is folded back on itself when it is placed on said surface to be carpeted to form a fold at one end of said seam line and two release liner ends at an opposite end of said seam line, and whereby removal of said release liner after seaming and stretching is affected by pulling on one of said two release liner ends.

15. The method of claim 11 wherein said surface to be carpeted is a carpet cushion on a substrate.

16. The method of claim 15 additionally including the step of firmly attaching said cushion to said substrate at least in the area underlying said pressure sensitive adhesive layer.

17. A method for installing carpeting in which at least two pieces of carpet, each of which have a pile surface, a backing surface, and an edge, are placed together with their edges abutting and seamed together along the abutting edges using a carpet seaming tape having a carrier with a first and second surface, a layer of hot melt adhesive on said first surface of said carrier, and a second surface of said carrier, the method comprising the steps laying the carpet pieces on the surface to be carpeted with the backing surface resting on the surface to be carpeted, and the edges abutting each other to form a seam line;

placing a strip of a second adhesive on the surface to be carpeted approximately centered on and extending along the seam line;

using an isolation means to prevent contact between the second adhesive and said backing surface of said carpet pieces;

placing the carpet seaming tape over said isolation means and under said abutting edges, whereby said carpet seaming tape is approximately centered between said abutting edges along the seam line with the hot melt adhesive layer facing the backing surface and the second surface facing the isolation means;

melting the hot melt adhesive, and pushing the abutting edges into contact with each other and the hot melt adhesive to form a seam;

stretching and anchoring the seamed carpet;

removing the isolation means; and, applying pressure to said pile side of said carpet along said seam to push said seam into contact with said second adhesive, creating a bond between said seam to said surface to be carpeted.

18. The method of claim 17 wherein said isolation means is a tear-resistant release liner.

19. The method of claim 18 wherein said release liner is folded back on itself when it is placed on said surface to be carpeted to form a fold at one end of said seam line and two release liner ends at an opposite end of said seam line, and whereby removal of said isolation means after seaming and stretching is affected by pulling on one of said two release liner ends.

20. The method of claim 17 wherein said surface to be carpeted is a carpet cushion on a substrate.

21. The method of claim 20 additionally including the step of firmly attaching said cushion to said substrate at least in the area underlying said second adhesive before centering the carpet seaming tape over said isolation means.

22. The method of claim 17 wherein a carpet cushion is interposed between said isolation means and said backing surface of said carpet pieces, said carpet cushion having a top surface and a bottom surface which rests upon said isolation means, and wherein said second surface of said carpet seaming tape is bonded to said top surface of said carpet cushion.

* * * * *